United States Patent [19]

Bleckmann et al.

[11] Patent Number: 4,515,375

[45] Date of Patent: May 7, 1985

[54] PROCESS AND ARRANGEMENT FOR SEALING THE GAP BETWEEN THE ENDS OF A GRAVURE PRINTING PLATE MOUNTED ON A PRINTING CYLINDER

[75] Inventors: Gerhard Bleckmann, Lampertheim; John Lynch, Monsheim; Heinz Mohr, Speyer, all of Fed. Rep. of Germany

[73] Assignee: BASF Aktiengesellschaft, Fed. Rep. of Germany

[21] Appl. No.: 587,671

[22] Filed: Mar. 8, 1984

[30] Foreign Application Priority Data

Mar. 12, 1983 [DE] Fed. Rep. of Germany ....... 3308807

[51] Int. Cl.³ ........................ F16J 15/16; B41F 27/06; B41F 27/12

[52] U.S. Cl. .......................................... 277/1; 277/9.5; 277/237; 101/378; 101/415.1

[58] Field of Search ................. 277/1, 9, 9.5, DIG. 7, 277/237; 101/378, 383, 384, 415.1

[56] References Cited

U.S. PATENT DOCUMENTS 3,261,262 7/1966 Hilfing et al. ...................... 277/1 X
3,358,598 12/1967 Middleton ........................... 101/378
4,031,838 6/1977 Schmidt et al. ...................... 277/1 X
4,343,011 8/1982 Murray et al. ............... 101/415.1 X

FOREIGN PATENT DOCUMENTS 2545618 4/1977 Fed. Rep. of Germany .
2633445 5/1977 Fed. Rep. of Germany .
2545124 8/1978 Fed. Rep. of Germany .
3049143 7/1982 Fed. Rep. of Germany .
1367860 6/1964 France ............................. 101/415.1
367436 2/1932 United Kingdom ............. 101/415.1

OTHER PUBLICATIONS

Deutscher Drucker, No. 41/6-11-1975, pp. 17-22.

*Primary Examiner*—Robert S. Ward
*Attorney, Agent, or Firm*—Keil & Weinkauf

[57] ABSTRACT

The gap (15) formed between the end portions (5) of a gravure printing plate (3) which is anchored in a groove (2) of a printing cylinder (1) on which the plate is mounted is covered with a sheet (6) which overlaps the end portions. The gap cavity (9) thus formed is then filled with a thermoplastic and/or hardenable material and when this has hardened the cover is removed.

24 Claims, 5 Drawing Figures

PROCESS AND ARRANGEMENT FOR SEALING THE GAP BETWEEN THE ENDS OF A GRAVURE PRINTING PLATE MOUNTED ON A PRINTING CYLINDER

The present invention relates to a process for sealing the gap between the ends of a gravure printing plate mounting on a printing cylinder of a sheet-fed or reel-fed rotary gravure printing machine, and to an arrangement for carrying out the process.

It is known that gravure printing plates consisting of a dimensionally stable and flexible carrier and a printing layer, for example consisting of a plastic, applied to the said carrier, may be mounted on a printing cylinder of a sheet-fed or reel-fed rotary gravure printing machine. For this purpose, the printing cylinder is provided with a groove, running parallel to or obliquely to the printing cylinder axis; the printing plate has one or both edges folded-over and hooked at an acute angle into the groove, thus holding the plate, as described, for example, in DE-A-2,545,124, DE-A-2,633,445 and DE-A-3,049,143. The gap thus formed between the two ends of the gravure printing plate is preferably sealed with a plastic composition. Hitherto, the procedure followed as a rule has been to introduce a flowable and hardenable composition into the gap from the cylinder surface and, when the composition has hardened, to subject the gap zone between the plate ends to a surface-finishing operation, for example by grinding, so that a continuous uniform surface resulted in the zone of the plate ends (Deutscher Drucker, No. 41/6-11-1975, pages 17–22). The work involved in this is relatively much and requires craft skill. Moreover, the printing cylinder has to be removed from the printing machine.

Further, DE-A-2,545,618 discloses that in the case of a wrap-around plate magnetically mounted on a gravure printing cylinder, the groove into which the plate is hooked may be covered, at the cylinder surface, by a shaped member, a rapidly hardening two-component mixture, for example an epoxy, polyester or acrylic resin mixture, being injected into the groove cavity thus formed. In this case, the shaped member must be very accurately machined to the curvature of the cylindrical surface of the gravure printing cylinder, and this is difficult and very expensive. Separate shaped members are required for different cylinders, ie. changing the cylinder size is not immediately possible. Moreover, it is very difficult to compensate for varying tolerances of the wrap-round plates, and yet this is necessary if the gap is to be sealed accurately. It has been found, therefore, that the sealed groove often needs a mechanical finishing operation.

It is an object of the present invention to provide a method of sealing the gap between the ends of a gravure printing plate mounted on a printing cylinder of a rotary gravure printing machine, especially of a plate provided with a plastic printing layer, and to do so at little expense and more simply than in the prior art, while ensuring that good surface quality results.

We have found that this object is achieved by a process, and an arrangement for carrying out this process, as described in the claims.

Accordingly, the present invention relates to a process for sealing the gap between the ends of a gravure printing plate mounted on a printing cylinder of a sheet-fed or reel-fed rotary gravure printing machine, wherein the gap together with the adjoining surfaces of the gravure printing plate is covered flush by means of a sheet, such as a piece of foil or preferably a firm, resiliently bendable plate, resting on the two end portions of the gravure printing plate, the sheet being pressed against the surface of the gravure printing plate, the gap cavity thus formed is filled with a thermoplastic and/or hardenable material and after the filling has hardened the cover is removed.

The invention further relates to an arrangement for carrying out the novel process, which comprises a sheet (6) for covering the gap (15), which sheet rests on the two end portions (5) of the gravure printing plate (3) mounted on a printing cylinder, and a pressure member (7) which overlaps the end portions, supports the sheet and is connected to a holding-down device, as well as one or more feed channels (11) opening into the gap cavity (9).

The invention yet further relates to specific embodiments of the process and of the arrangement, as given in the description which follows and in the claims.

The examples which follow and are shown diagrammatically in the drawing illustrate the invention.

Figure 1:
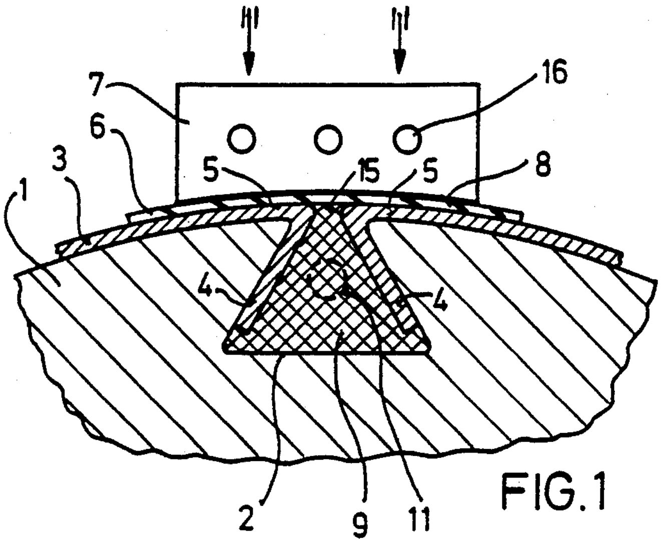
FIG. 1 shows, in cross-section, a portion of a printing cylinder in the region of the groove for hooking-in the ends of the gravure printing plate, together with the sheet connecting the ends and with the pressure member placed thereon.

As shown in FIG. 1, the printing cylinder 1 of a sheet-fed or reel-fed rotary gravure printing machine is provided with a groove 2 running parallel to the printing cylinder axis and widening from the cylinder surface in the direction of the center of the cylinder; the gravure printing plate 3 mounted on the printing cylinder is hooked at an acute angle into the groove by, in the example shown both, folded-over edges 4. To seal the gap 15 between the two ends, the sheet 6 which overlaps the two end portions 5 of the gravure printing plate, for example a piece of foil or a firm resilient plate, is placed over the gap, the sheet being supported, and pressed against the surface of the gravure printing plate, by a pressure member 7 which can be brought into position by a holding-down device not shown in the drawing.

The sheet 6, which in general is from 1 to 10 mm, especially from 2 to 8 mm, thick is preferably transparent, since this permits observation of the sequence of filling the gap cavity 9 as well as of the absence of leaks between the sheet 6 and the surfaces on which it rests. The sheet 6 is in particular a plastic foil or a resiliently bendable plastic plate, for example consisting of a polyester, nylon, polystyrene, polyethylene, polypropylene or, preferably, polyacrylates or polymethacrylates, eg. polymethyl methacrylate. If photohardening reactive resins are used to fill the gap, the sheet 6 transmits the actinic light used for hardening. If, as discussed in more detail below, the pressure member 7 comprises heating or cooling elements, which can in particular be advantageous for thermosetting reactive resins or thermoplastic filling materials, the sheet 6 can moreover consist of a material of good heat conductivity, for example a metal plate. In other respects, the material constituting the sheet 6 is so chosen that it can easily be pulled off or lifted off the hardened gap filling. If appropriate, the sheet 6 can be surface-coated with a release agent, for example can be siliconized, or a thin release film can be placed between the surface of the gravure printing plate and the sheet 6.

Figure 5:
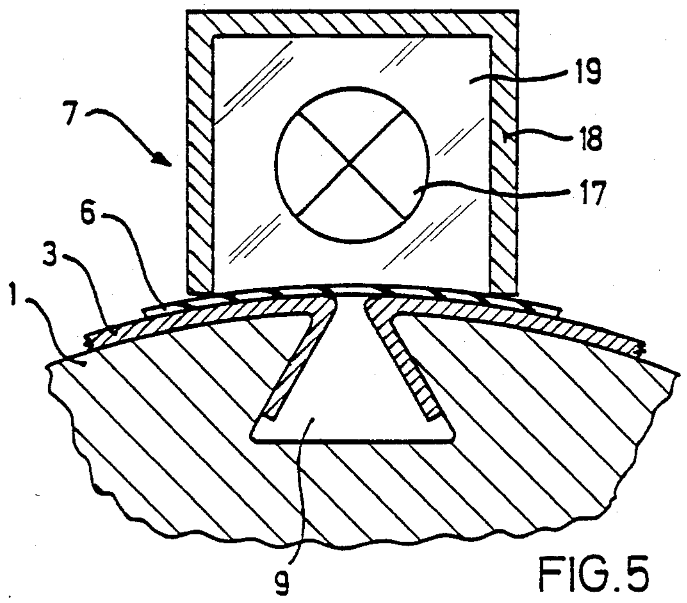
FIG. 5 shows the printing cylinder as in FIG. 1, with a source of radiation located in the pressure member.

The pressure member 7 can, as shown in FIG. 1, be a closed—substantially solid—shaped member, whose supporting surface 8 advantageously has about the same curvature as the surface of the end portions 5 of the gravure printing plate 3, though it may deviate therefrom, ie. it may in particular have a greater curvature. As may be seen from FIG. 5 the pressure member 7 can, in another and also very advantageous embodiment, be formed by, for example, a beam of U-shaped cross-section open toward the printing cylinder 1.

Figure 2:
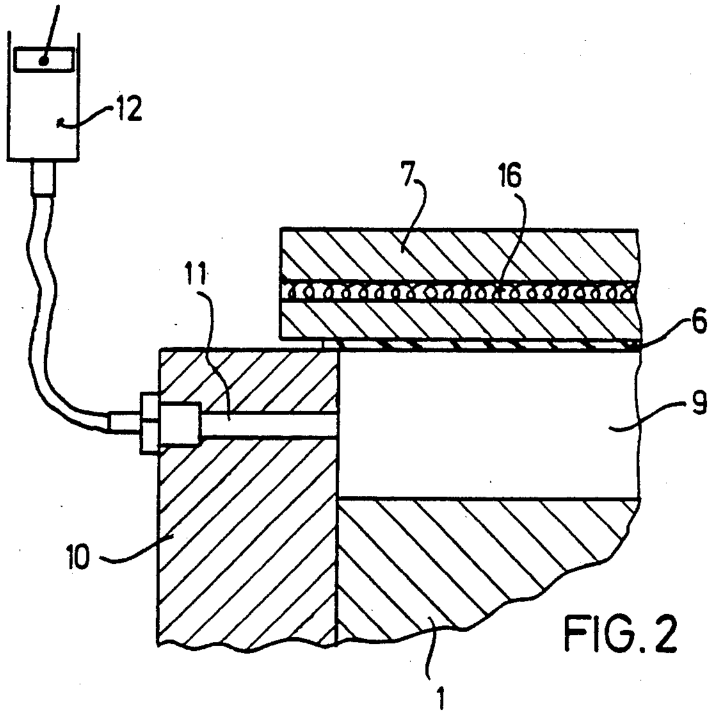
FIG. 2 shows the printing cylinder as in FIG. 1, but in lengthwise section.

After applying the sheet 6, the gap 15 is sealed with a suitable filling material which must of course be resistant to the printing inks. In one embodiment of the invention, the gap cavity 9 formed is, for this purpose, filled from the end face of the printing cylinder 1 (FIG. 2), via one or more feed channels 11 located in its bearing side-plates 10, with a flowable and hardenable material, for example a thermoplastic or a hardenable reactive resin. A metering device 12, for example a metering plunger, for the thermoplastic material or for the reactive resins is provided for this purpose. After hardening has occurred, the pressure member 7 is retracted and the sheet 6 removed. A surface which provides a flush connection between the surfaces of the two end portions 5 of the gravure printing plate 3 has thus been formed and no longer needs to be subjected to any finishing operation.

Advantageous filling materials which may be used, in addition to conventional thermoplastics, are hot-melt adhesives based, for example, on polyvinyl acetate, nylon, polyesters or thermoplastics such as polyolefins, styrene-butadiene block copolymers etc. Moreover, thermosetting and in particular photohardening reactive resins, eg. epoxy resins, acrylate resins, isocyanate resins, silicone resins, unsaturated polyester resins and the like, are very suitable.

For better adhesion of the filling material, the ends of the gravure printing plate may be treated with an adhesion promoter. More rapid hardening of the reactive resins used as the filling material may be achieved by treating the printing plate ends with an activator or catalyst.

The hardening of the filling material after the gap has been filled is effected, in the case of thermoplastics, by cooling the molten polymer, in the case of thermosetting reactive resins by suitable application of heat (the heat sources being located within or above the gap cavity 9) and in the case of photohardening reactive resins by irradiation with actinic light, using the conventional radiation sources for such light.

Figure 3:
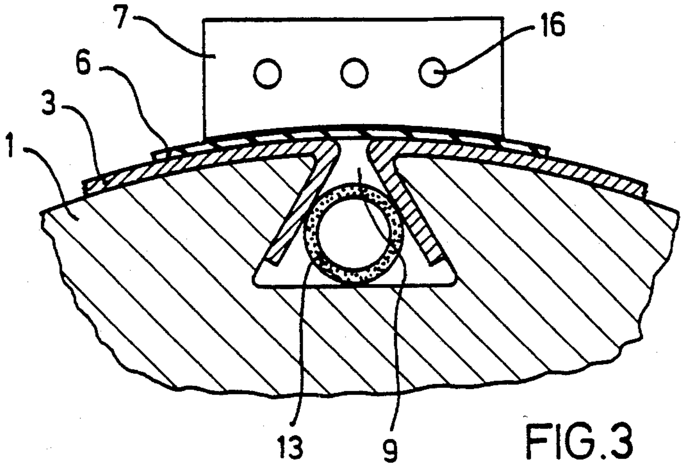
FIG. 3 shows the printing cylinder as in FIG. 1, with a hollow body of circular cross-section arranged in the gap cavity.

To prevent penetration of the filling material into the interior of the printing cylinder, and especially into any clamping devices and components, the gap cavity 9 is sealed in the radially inward direction, ie. toward the center of the cylinder. This sealing can be achieved and assured through purely constructional features of the printing cylinder 1. However, it is also possible, and advantageous, to provide in the gap cavity 9 a sealing element 13 extending over the entire length of the gap (FIG. 3). This sealing element 13 can be compact or, as the drawing shows, can be a hollow body, preferably of circular cross-section, for example a silicone rubber tube. If such hollow bodies are used, they can be connected to a source of a pressure medium via a further feed channel (not shown in the drawing) and can thereby be inflatable. This makes it possible both to achieve a secure and reliable seal and to compensate for any shrinkage of the filling material which may occur on hardening. If not only a feed channel but also an exit channel is provided for the hollow body 13, then the latter can be connected into a circuit of a heating medium or cooling medium which is under pressure, so that, depending on the filling material used, the flow of the material when filling the gap cavity 9 and/or the hardening of the material after filling the gap cavity 9 may additionally be controlled and influenced.

In a very advantageous embodiment of the process, the flowable, hardenable filling material can be introduced into the gap cavity 9 through the hollow body 13. For this purpose, the hollow body 13 is provided, along the gap, with one or more small orifices opening into the gap cavity 9, through which orifices the filling material can enter the cavity 9 from the hollow body 13. This ensures rapid uniform distribution of the filling material, which is important in achieving a perfect seal of the gap. For example, it has proved advantageous to introduce the filling material into the cavity 9 through an orifice which is about half way along the length of the hollow body 13. In this embodiment of the process, the hollow body 13 is connected to the metering device 12 (FIG. 2) for the flowable, hardenable filling material via the feed channels 11 located in the bearing sideplates 10 of the printing cylinder 1. Any pressure in the hollow body 13 which may be needed to seal the gap cavity 9 securely in the radially inward direction toward the cylinder center can in that case be created by means of the filling material in the hollow body 13.

Figure 4:
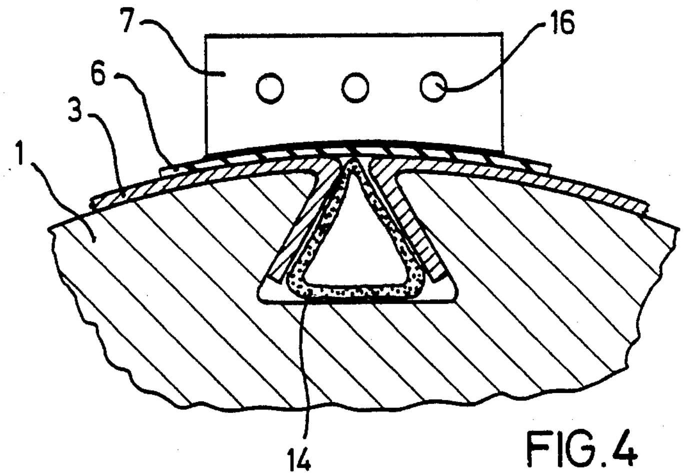
FIG. 4 shows the printing cylinder as in FIG. 1, with a deformable hollow profile body located in the gap cavity.

In a further embodiment according to the invention, the gap 15 is sealed by introducing into the gap cavity 9, in place of a flowable filling material, a deformable hollow profile body 14 (FIG. 4) made of a thermoplastic and extending over the entire length of the gap. The profile body is connected, via a feed channel in the bearing sideplate 10, with a source of heating medium which is under pressure, so that the surface of the profile body is pressed into the gap 15 between the end portions 5 of the gravure printing plate 3 to fill the gap and harden therein. The pressure in the profile body can also be created by any desired pressure-generating and pressure-transferring medium, for example by compressed air, in which case the surface of the profile is heated via, for example, the pressure member 7.

For this purpose the pressure member, which in this case may for example be of steel or aluminum, is provided with channels 16 which extend over the entire length of the gap cavity 9 and are connected to a heating medium circuit. This construction of the pressure member can also be used advantageously for the other process embodiments and arrangements described above, especially in the case of flowable thermoplastic or thermosetting filling materials, cooling media also being employable where appropriate. Of course, electrical heating, for example resistance heating or inductive heating, may be provided in place of a heating medium or cooling medium circuit in the pressure member.

Instead of a heating medium circuit or of electrical heating, a radiation source 17 for actinic light, for example a fluorescent tube (FIG. 5), extending over the entire length of the gap cavity 9, may be located in the pressure member 7, this being particularly advantageous when using photohardening filling compositions. In that case the pressure member 7 consists, for example, of a beam 18 of U-shaped cross-section open toward the printing cylinder 1, the radiation source 17 being held in the beam. On applying the beam 18 against the cylinder, the light-transmitting foil or, more especially, firm resilient plate employed as the sheet 6 is bent in a curved line between the two arms of the beam 18 and firmly pressed against the cylindrical surface, the line of curvature corresponding exactly to the curvature of the surface of the end portions 5 of the gravure printing plate 3. This creates a flush seal of the gap cavity 9 at the cylinder surface. The cavity 19 of the open beam 18 can also be filled with a material which in particular transmits actinic light, for example a casting resin. If, on covering the gap 15, the pressure member 7 used is a molding member having a solid supporting surface 8 (similarly to the arrangement shown in FIG. 1), and a radiation source 17 (FIG. 5) is located in this molding member, then at least the supporting surface 8 must be made of a material which transmits actinic light.

In other respects, the pressure member 7 can in principle be made of any material, namely not only metals but also, in particular, plastics.

Using the process according to the invention and the arrangement for carrying out this process, the gap in a gravure printing wrap-around plate mounted on a printing cylinder can be sealed in a simple manner, in such a way that during sheet-fed or reel-fed rotary gravure printing no problems are observed, especially in respect of doctor performance or of creation of an imprint of the gap. Moreover, depending on the filling material used, image formation in the form of ink-accepting cells can be introduced into the gap zone, for example by mechanical engraving or laser engraving. The process according to the invention is simple to carry out and the arrangement for doing so can be handled quickly and economically without having to remove the printing cylinder from the printing machine. All known and conventional gravure printing wrap-round plates which can be mounted on the printing cylinder of a sheet-fed or reel-fed rotary gravure printing machine may be employed in the process according to the invention, for example the conventional gravure printing plates made of metal with a Ballard skin or, particularly advantageously, gravure printing plates having a plastic printing layer, in which plates a suitable printing layer carrier is provided with a plastic layer into which the ink-accepting recesses (cells) have been introduced by mechanical engraving or laser engraving (cf. for example, DE-A-2,752,500 or DE-A-3,028,098) or photomechanically by imagewise exposure and development of a suitable photosensitive recording material (cf., for example, DE-A-2,054,833, DE-A-2,061,287, DE-A-3,128,949 and DE-A-3,128,951). Similarly, the cells can of course be introduced into the gravure printing plates after the latter has been mounted on the printing cylinder and after the gap has been sealed. For the purposes of the present invention, gravure printing plates include both wrap-round plates with cells already formed and wrap-round plate blanks in which the cells have not yet been formed.

To remove the gravure printing plate from the printing cylinder after printing, the filling of the gap between the plate ends can be removed again by machining or by the use of a tear-wire which has been introduced beforehand.

We claim:

1. A process for sealing the gap between the ends of a gravure printing plate mounted on a printing cylinder of a sheet-fed or reel-fed rotary gravure printing machine, one or both ends of the gravure-printing plate being folded over and hooked into a groove running parallel to or obliquely to the printing cylinder axis, the process comprising placing a sheet over the gap and the adjoining two end portions of the surface of the gravure printing plate, pressing the sheet against the surface of the gravure printing plate so that the gap is covered in a flush manner by the sheet, filling the resulting gap cavity with a thermoplastic and/or hardenable material, solidifying the filling material and removing the sheet after the filling material has hardened.

2. A process as claimed in claim 1, wherein the sheet is a plastic film or plastic-plate.

3. A process as claimed in claim 1, wherein the sheet has a thickness of from 1 to 10 mm.

4. A process as claimed in claim 1, wherein the sheet is transparent.

5. A process as claimed in claim 1, wherein the sheet is provided with a release agent on the surface facing the gravure printing plate.

6. A process as claimed in claim 1, wherein a thin release film is placed between the sheet and the surface of the gravure printing plate.

7. A process as claimed in claim 1, wherein the gap cavity is filled with flowable and hardenable material through one or more feed channels opening into the cavity.

8. A process as claimed in claim 7, wherein a thermoplastic is employed as the filling material.

9. A process as claimed in claim 7, wherein a hot-melt adhesive is employed as the filling material.

10. A process as claimd in claim 7, wherein a thermosetting or photohardening reactive resin is employed as the filling material.

11. A process as claimed in claim 7, wherein the gap cavity is sealed in the radially inward direction toward the cylinder center by means of a sealing element extending over the entire length of the gap cavity.

12. A process as claimed in claim 11, wherein the sealing element used is a hollow body which is deformable under pressure and which is internally subjected to a pressure medium.

13. A process as claimed in claim 12, wherein the hollow body has, along the gap, one or more small orifices opening into the gap cavity and the flowable hardenable filling material is introduced into the gap cavity through the hollow body.

14. A process as claimed in claim 1, wherein, to seal the gap, a profile body made of a thermoplastic and extending over the entire length of the gap cavity is introduced into the cavity, and the said body is deformed and softened under the action of pressure and heat, thereby pressed fillingly into the gap between the end portions of the gravure printing plate, and thereafter hardened again by cooling.

15. Arrangement for sealing the gap between the ends of a gravure printing plate mounted on a printing cylinder of a sheet-fed or reel-fed rotary gravure printing machine, the arrangement comprising a printing cylinder with a groove running parallel to or obliquely to the printing cylinder axis, in which groove one or both ends of the gravure printing plate have, after being folded over, been hooked and anchored, a sheet resting on the two end portions, adjoining the gap, of the surface of the gravure printing plate so as to cover the gap, a pressure member which overlaps these end portions, supports the sheet and is connected to a holding-down device, and one or more feed channels, opening into the gap cavity, for the filling material or for a pressure-generating medium and/or a heating or cooling medium.

16. Arrangement as claimed in claim 15, wherein the feed channels are connected to a metering device for a flowable, hardenable filling material.

17. Arrangement as claimed in claim 16, wherein the gap cavity has a further feed channel, for a hollow body extending over the entire length of the cavity, the channel being connected to a source of pressure medium or heating medium and/or cooling medium.

18. Arrangement as claimed in claim 16, wherein the feed channels inside the cylinder groove are connected to a hollow body extending over the entire length of the groove, the body having, along the gap, one or more small orifices opening into the gap cavity.

19. Arrangement as claimed in claim 15, wherein there is located, in the gap cavity, a deformable hollow profile body made of a thermoplastic and extending over the entire length of the cavity, the body being connected, via a feed channel, to a source of pressure or to a source of a heating and/or cooling medium which is under pressure.

20. Arrangement as claimed in claim 15, wherein the pressure member has channels, extending over the entire length of the gap cavity, for a heating medium or cooling medium circuit, or has heating elements.

21. Arrangement as claimed in claim 15, wherein the pressure member has one or more radiation sources for actinic light, the sources extending over the entire length of the gap cavity and acting in the direction of the latter.

22. Arrangement as claimed in claim 15, wherein the pressure member consists of a beam of U-shaped cross-section open toward the printing cylinder.

23. Arrangement as claimed in claim 15, wherein the sheet consists of a plastic foil or plastic plate of a thickness from 1 to 10 mm.

24. Arrangement as claimed in claim 15, wherein the sheet is transparent.

* * * * *